US012024859B2

(12) United States Patent
Bebeti et al.

(10) Patent No.: US 12,024,859 B2
(45) Date of Patent: Jul. 2, 2024

(54) METHOD FOR OPERATING A DRIVETRAIN FOR A WORK MACHINE, DRIVETRAIN FOR A WORK MACHINE, AND WORK MACHINE

(71) Applicant: ZF Friedrichshafen AG, Friedrichshafen (DE)

(72) Inventors: Migen Bebeti, Munich (DE); Rico Glöckner, Pocking (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 386 days.

(21) Appl. No.: 17/440,107

(22) PCT Filed: Mar. 17, 2020

(86) PCT No.: PCT/EP2020/057207
§ 371 (c)(1),
(2) Date: Sep. 16, 2021

(87) PCT Pub. No.: WO2020/187878
PCT Pub. Date: Sep. 24, 2020

(65) Prior Publication Data
US 2022/0186467 A1    Jun. 16, 2022

(30) Foreign Application Priority Data
Mar. 19, 2019  (DE) .......................... 102019203724.0

(51) Int. Cl.
*E02F 9/20*   (2006.01)
*F16H 61/04*  (2006.01)
(Continued)

(52) U.S. Cl.
CPC ............ *E02F 9/207* (2013.01); *E02F 9/2079* (2013.01); *F16H 61/04* (2013.01);
(Continued)

(58) Field of Classification Search
CPC ........ E02F 9/207; E02F 9/2079; F16H 61/04; F16H 61/0006; F16H 2057/02043;
(Continued)

(56) References Cited

U.S. PATENT DOCUMENTS 8,858,391 B2 * 10/2014 Tolkacz ................. B60K 6/387
475/198
2009/0325760 A1 * 12/2009 Soliman ................ B60K 6/485
701/54
(Continued)

FOREIGN PATENT DOCUMENTS

DE        10340472 A1    6/2005
DE     102010031156 A1    1/2012
(Continued)

OTHER PUBLICATIONS

International Search Report and Written Opinion for PCT/EP2020/057207 mailed Jul. 10, 2020 (11 pages; with English translation).

*Primary Examiner* — Donald J Wallace
(74) *Attorney, Agent, or Firm* — Kristin L. Murphy

(57) ABSTRACT

The disclosure relates to a method for operating a drivetrain for a work machine, wherein a first electric motor drives a work drive of the work machine via a first transmission arrangement, wherein a second electric motor drives a traction drive of the work machine via a second transmission arrangement, and wherein, during a shift process of the second transmission arrangement from a relatively low gear ratio stage to a relatively high gear ratio stage, the rotational speed of the second electric motor is reduced. The method according to the disclosure is distinguished by the fact that, during the shift process, a driving connection is produced between the first electric motor and the second transmission arrangement by a first clutch, such that, during the shift process, the first electric motor drives the traction drive. The
(Continued)

disclosure furthermore relates to a corresponding drivetrain and to a work machine.

16 Claims, 4 Drawing Sheets

(51) Int. Cl.
  *F16H 57/02* (2012.01)
  *F16H 61/00* (2006.01)
(52) U.S. Cl.
  CPC .............. *F16H 2057/02043* (2013.01); *F16H 61/0006* (2013.01); *F16H 2061/0422* (2013.01); *F16H 2061/0433* (2013.01)
(58) Field of Classification Search
  CPC ..... F16H 2061/0422; F16H 2061/0433; B60K 2001/001; B60K 2025/005; B60K 1/00; B60K 1/02; B60K 25/06; B60Y 2200/415; B60Y 2200/90; B60W 30/1886; B60W 30/1888; B60W 30/19; B60W 10/02; B60W 10/08; B60W 10/10; B60W 10/11; B60W 10/113
  See application file for complete search history.

(56) References Cited

U.S. PATENT DOCUMENTS

| | | | |
|---|---|---|---|
| 2012/0083978 A1* | 4/2012 | Tajima | F16H 61/0213 |
| | | | 701/55 |
| 2013/0214928 A1* | 8/2013 | Kuittinen | E21B 7/025 |
| | | | 175/57 |
| 2016/0075257 A1* | 3/2016 | Wein | B60L 50/51 |
| | | | 180/65.7 |
| 2018/0222484 A1 | 8/2018 | Shively et al. | |
| 2019/0101199 A1* | 4/2019 | Bedert | F16H 3/126 |
| 2019/0135261 A1* | 5/2019 | Gersten | B60W 10/113 |
| 2022/0144057 A1* | 5/2022 | Glöckner | B60W 30/1886 |
| 2022/0186468 A1* | 6/2022 | Glöckner | E02F 9/2079 |

FOREIGN PATENT DOCUMENTS

| | | | | |
|---|---|---|---|---|
| DE | 102010063503 A1 | | 6/2012 | |
| DE | 202014000738 U1 | | 4/2014 | |
| DE | 102013007354 A1 | | 10/2014 | |
| DE | 102016206970 A1 | * | 10/2017 | ............ B60K 17/28 |
| EP | 0962597 A2 | | 12/1999 | |
| EP | 3098106 A1 | | 11/2016 | |
| WO | 2014054983 A1 | | 4/2014 | |

* cited by examiner

METHOD FOR OPERATING A DRIVETRAIN FOR A WORK MACHINE, DRIVETRAIN FOR A WORK MACHINE, AND WORK MACHINE

CROSS-REFERENCE TO RELATED APPLICATION

This application is a national stage of International Application No. PCT/EP2020/057207, filed Mar. 17, 2020, the disclosure of which is incorporated herein by reference in its entirety, and which claimed priority to German Patent Application No. 102019203724.0, filed Mar. 19, 2019, the disclosure of which is incorporated herein by reference in its entirety.

TECHNICAL FIELD

The present disclosure relates to a method for operating a drive train for a working machine. A drive train for a working machine is also disclosed, as well as a corresponding working machine.

BACKGROUND

Electrically driven working machines, such as, for example, wheel loaders, compact loaders, telescopic handlers, dumpers or excavators, are known in the prior art. Such electrically driven working machines are either driven purely electrically, that is to say the machines have only an electric battery or an electric accumulator for their energy supply. Or they are driven diesel-electrically, which means that the required energy is provided by a diesel-driven generator, usually in conjunction with an electric buffer store, such as, for example, a correspondingly dimensioned capacitor. In all cases, mechanical power required for a traction drive and a working drive is generated by one or more electric motors. Furthermore, hybrid-electric working machines are also known, in which the required mechanical power is generated primarily by a combustion engine, usually a diesel engine. An electric motor which is additionally provided here typically performs a so-called boost function.

Power-shiftable transmissions for working machines are likewise known, in which, during a shifting operation, a speed synchronization between a speed of a drive unit and a speed of a gear stage to be engaged is carried out. In the case of an upshift operation, the speed of the drive unit is correspondingly reduced, and in the case of a downshift operation it is correspondingly increased.

In this context DE 20 2014 000 738 U1 describes a wheel loader which is driven purely electromotively, which has a first electric motor for a traction drive and a second electric motor for a working drive.

From EP 0 962 597 A2 there is known a battery-operated working machine which has two electric motors for the traction drive and a further electric motor for the working drive. The two electric motors for the traction drive are integrated into the front axle, wherein each electric motor drives a wheel.

From DE 10 2010 063 503 A1 there is further known a multistage transmission of the planetary type of a working machine. The multistage transmission comprises a housing, in which four planetary gear sets and a plurality of shafts are received, and shifting elements which are formed by at least one brake and clutches and by the targeted actuation of which eight different transmission ratios between a drive shaft and an output shaft can be described. The transmission of DE 10 2010 063 503 A1 permits power-shiftability.

The known electrically driven working machines are, however, disadvantageous in that a speed synchronization of the gear stages involved in a shifting operation under power is more difficult compared to an identical operation in a working machine driven by a combustion engine. The reason for this is on the one hand the comparatively greater moment of inertia of an electric motor compared to a combustion engine, and on the other hand the comparatively greater speed spectrum of the electric motor, as a result of which there may also be correspondingly greater speed differences. This conventionally requires a correspondingly larger and more powerful dimensioning of the clutches in electrically driven working machines. However, such a comparatively larger and more powerful design of the clutch results in an increased space requirement and an increased weight and increased production costs.

Thus, what is needed is an improved method for operating a drive train for a working machine.

SUMMARY

A method for operating a drive train for a working machine is proposed herein.

The disclosure relates to a method for operating a drive train for a working machine, wherein a first electric motor drives a working drive of the working machine via a first transmission arrangement, wherein a second electric motor drives a traction drive of the working machine via a second transmission arrangement, and wherein, during a shifting operation of the second transmission arrangement from a lower gear stage into a higher gear stage, a speed reduction of the second electric motor is carried out. The method according to the disclosure is distinguished by the fact that, during the shifting operation, a drive connection is established between the first electric motor and the second transmission arrangement via a first clutch, so that the first electric motor drives the traction drive during the shifting operation.

During a shifting operation from a lower gear stage into a higher gear stage, the first electric motor, which is associated with the traction drive, must reduce its speed very quickly in order to establish the necessary speed synchronization between the clutch elements involved in the shifting operation. According to the prior art, this speed synchronization is carried out via corresponding friction work between the clutch elements involved in the shifting operation, wherein in particular in electric motors comparatively large speed differences occur, which must disadvantageously be equalized by particularly powerful and thus heavy and expensive clutches. However, because the speed synchronization is carried out by friction work, a torque can continue to be transmitted from the second electric motor to the traction drive at any time during the shifting operation.

The method according to the disclosure starts from here: By advantageously making it possible that the traction drive can be driven during the shifting operation of the second transmission arrangement by the first electric motor, which is actually associated with the working drive, the second electric motor can be separated in terms of drive from the traction drive and a new, reduced speed can be set or adjusted without a loss of traction in the traction drive. Accordingly, when the method according to the disclosure is implemented, it is not necessary to achieve the speed synchronization by friction work, so that the clutches of the second transmission arrangement that are involved in the shifting operation can be designed so as to be comparatively smaller and less expensive.

Within the meaning of the disclosure, a shifting operation from a lower gear stage into a higher gear stage is understood as being a shifting operation from a gear stage which has a comparatively lower output speed and a comparatively higher output torque into a gear stage which has a comparatively higher output speed and a comparatively lower output torque.

Although it is conceivable and to implement the method according to the disclosure also in the case of a downshift operation, that is to say in the case of a shifting operation from a higher gear stage into a lower gear stage, this will generally not be necessary since, in the case of a speed synchronization in the sense of increasing the speed of the second electric motor, a torque can be transmitted to the traction drive at any time during the shifting operation.

The speed reduction of the second electric motor that is necessary for the speed synchronization can take place by energization of the second electric motor in the opposite direction to the present direction of rotation. An active braking torque is thereby built up, which permits an almost immediate reduction and synchronization of the speed of the second electric motor.

However, it is likewise possible to transfer the second electric motor into a generator mode, so that the required speed reduction or speed synchronization results, without energization, solely from the electromagnetic braking force which the rotor of the second electric motor experiences due to the generator mode.

It is also conceivable to provide not only a single first or second electric motor but a plurality of first or second electric motors, which can be coupled with one another, for example, via a summation gear or can be separably connected in terms of drive to the first or second transmission arrangement.

In one exemplary arrangement, at least the second transmission arrangement has a plurality of gear stages in the form of forward gears and at least one gear stage in the form of a reverse gear. In one exemplary arrangement, the number of forward gears corresponds to the number of reverse gears. The first transmission arrangement can also have more than only one gear stage in the form of a forward gear. In addition, one or more gear stages of the first transmission arrangement that are in the form of a reverse gear are also conceivable.

According to one exemplary arrangement of the disclosure it is provided that the shifting operation is carried out under power. Within the meaning of the disclosure, the expression "under power" refers to a state of the drive train in which a torque is transmitted from the second electric motor, or, during the shifting operation, also from the first electric motor, to the traction drive so that the working machine experiences an acceleration, for example, or moves uphill on a slope at a constant speed. Specifically, during the shifting operation, if the method according to the disclosure were not used, there would be an interruption in the transmission of the torque unless a disadvantageously large, expensive and heavy clutch according to the prior art was used. To this extent, the advantages of the method according to the disclosure manifest themselves also and especially in a shifting operation under power, since this is made possible without interrupting the traction and with the presence of a comparatively small, inexpensive and low-power clutch. In terms of effect, a drive train in which the method according to the disclosure is implemented thus achieves the same power-shiftability, without interruption of the traction, as a drive train which is provided with a comparatively large, heavy and expensive clutch.

According to a further exemplary arrangement of the disclosure, it is provided that the first electric motor drives the traction drive and the working drive simultaneously during the shifting operation. This has the advantage that the working drive is also not interrupted by the shifting operation and is available continuously. A drive connection is merely established between the first electric motor and the second transmission arrangement via the first clutch, so that, during the shifting operation, a power requirement required by the traction drive can be provided by the first electric motor in addition to the power requirement of the working drive.

According to a further exemplary arrangement of the disclosure it is provided that the first electric motor drives the traction drive only inasmuch as a power difference between a power requirement of the traction drive and a power which can be provided by the second electric motor during the shifting operation is bridged. This thus means that the mechanical power provided by the first electric motor during the shifting operation is advantageously increased exactly such that, on the one hand, the traction drive does not experience any power limitation due to the shifting operation but, on the other hand, also does not experience any unrequired power increase. This has the advantage that the behavior of the traction drive is not affected by the shifting operation. A power required, for example, by an operator of the working machine for the traction drive is thus provided without limitation also during the shifting operation, for which purpose the power provided by the first electric motor is increased to the extent that the power provided by the second electric motor is reduced owing to the shifting operation. An overall power provided to the traction drive is, however, maintained.

According to one exemplary arrangement of the disclosure it is provided that the first electric motor drives the traction drive only inasmuch as a power requirement of the working drive can be met fully during the shifting operation. This has the advantage that it is ensured in every case that the working drive receives the required power demanded by an operator of the working machine even during the shifting operation, so that it is possible to avoid a sudden power drop of the working drive, in particular a power drop that is not expected by the operator. A power drop of the working drive that is not expected by the operator could otherwise result in a dangerous situation, for example if a lifting apparatus of the working machine that is operated by the working drive no longer receives the power necessary to hold a lifted load. A short-time power loss in the traction drive, on the other hand, does not usually result in a dangerous situation.

It is important that the power requirement of the working drive is met fully by the first electric motor in particular in situations where comparatively high power requirements are made both by the traction drive and by the working drive which can no longer be provided in total by the first electric motor. Thus, if the required total power exceeds the maximum power that can be provided by the first electric motor, the requirement of the working drive is first met in full. A remaining residual power of the first electric motor which can still be provided is then made available to the traction drive during the shifting operation.

The disclosure relates further to a drive train for a working machine, comprising a first electric motor and a second electric motor and also a first transmission arrangement and a second transmission arrangement, wherein the first electric motor and the first transmission arrangement are associated with a working drive of the working machine and wherein the second electric motor and the second transmission arrangement are associated with a traction drive of the working machine. The drive train according to the disclosure is distinguished by the fact that a drive connection can be established between the first electric motor and the second transmission arrangement via a first clutch. The drive train according to the disclosure thus advantageously comprises all the necessary devices to be able to implement the method according to the disclosure. This in turn results in the advantages already described in connection with the method according to the disclosure.

In order to ensure that the method according to the disclosure is implemented optimally by the drive train according to the disclosure, the first electric motor and the second electric motor are preferably matched to one another in terms of the power they are able to provide and their torque-speed characteristic. This means that the maximum power which can be provided by the first electric motor advantageously moves in a range of from 50% to 150% of the maximum power which can be provided by the second electric motor, and in one exemplary arrangement, in a range of from 80% to 120%. In addition, the torque-speed characteristic of the first electric motor advantageously moves in a range of from 50% to 150% of the torque-speed characteristic of the second electric motor, and in one exemplary arrangement in a range of from 80% to 120%.

The drive train preferably further comprises, for controlling or regulating the speed or torque of or the power to be provided by the first electric motor and the second electric motor, in each case an own power electronics or a single common power electronics. Likewise, the drive train comprises an electronic control device which controls or regulates the first electric motor and the second electric motor via the respective own power electronics or via the common power electronics.

According to a an exemplary arrangement of the disclosure it is provided that the first electric motor and the second electric motor are arranged in a common housing. This allows the first electric motor and the second electric motor to be arranged in a space- and weight-saving manner within the drive train in a working machine. Moreover, the common housing saves weight and costs compared to two individual housings. The first and the second electric motor can be installed in a common housing, for example, axially one behind the other, wherein the motor output shafts, for example, can point out of the housing in opposite axial directions. However, an arrangement axially side by side in a correspondingly configured housing is likewise possible, so that the two motor output shafts can point, for example, in the same axial direction.

According to one exemplary arrangement of the disclosure it is provided that the second transmission arrangement is power-shiftable over a plurality of gear stages. This has the advantage that the power-shifting capacity which can be provided by the method according to the disclosure is ensured not only for a shifting operation from a very specific lower gear stage into a very specific higher gear stage but for a plurality of gear stages. The drive train according to the disclosure thus becomes more flexible. This requires a speed-torque behavior correspondingly adapted therefor and a correspondingly configured performance, in particular of the first electric motor.

In one exemplary arrangement, the second transmission arrangement is power-shiftable over all gear stages. This results in yet further increased flexibility of the drive train according to the disclosure.

In one exemplary arrangement, it is provided that the first transmission arrangement is shiftable, or power-shiftable by the method according to the disclosure via three second clutches. In practical application, this has proved to be a good compromise between flexibility owing to a plurality of power-shiftable gear stages on the one hand and the required space requirement, the weight and the production costs of the drive train on the other hand.

According to a further exemplary arrangement of the disclosure it is provided that the drive train is configured to implement the method according to the disclosure.

In one exemplary arrangement, it is provided that the first electric motor and/or the second electric motor are further configured to recover kinetic energy in braking operation of the working machine. By operation of the drive connection according to the disclosure which can be established between the first electric motor and the second transmission arrangement via the first clutch, kinetic energy can advantageously be recovered both by the second electric motor and by the first electric motor. For this purpose, the drive train further comprises an electrical energy store to which the electrical energy supplied by the recovery operation can be supplied. In recovery operation, the first electric motor and/or the second electric motor work as generators and convert mechanical, namely kinetic, energy into electrical energy. This electrical energy can later be drawn from the electrical energy store again if required, in order to supply the first electric motor and/or the second electric motor. In addition, it can also be provided that the electrical energy store can be charged with external electrical energy via a charging cable or other suitable charging device, for example an inductive charging device. The use of the first electric motor and/or the second electric motor for recovery additionally reduces the wear of a mechanical friction brake.

The disclosure relates further to a working machine comprising a drive train according to the disclosure. The advantages already described in connection with the drive train according to the disclosure are also obtained for the working machine according to the disclosure.

According to one exemplary arrangement of the disclosure it is provided that the working machine is in the form of a wheel loader.

Alternatively, the working machine can preferably also be in the form of a dumper, excavator, telescopic handler or tractor.

BRIEF DESCRIPTION OF THE DRAWINGS

The disclosure will be explained by way of example hereinbelow with reference to embodiments shown in the figures, wherein in the figures.

DETAILED DESCRIPTION

Figure 1:
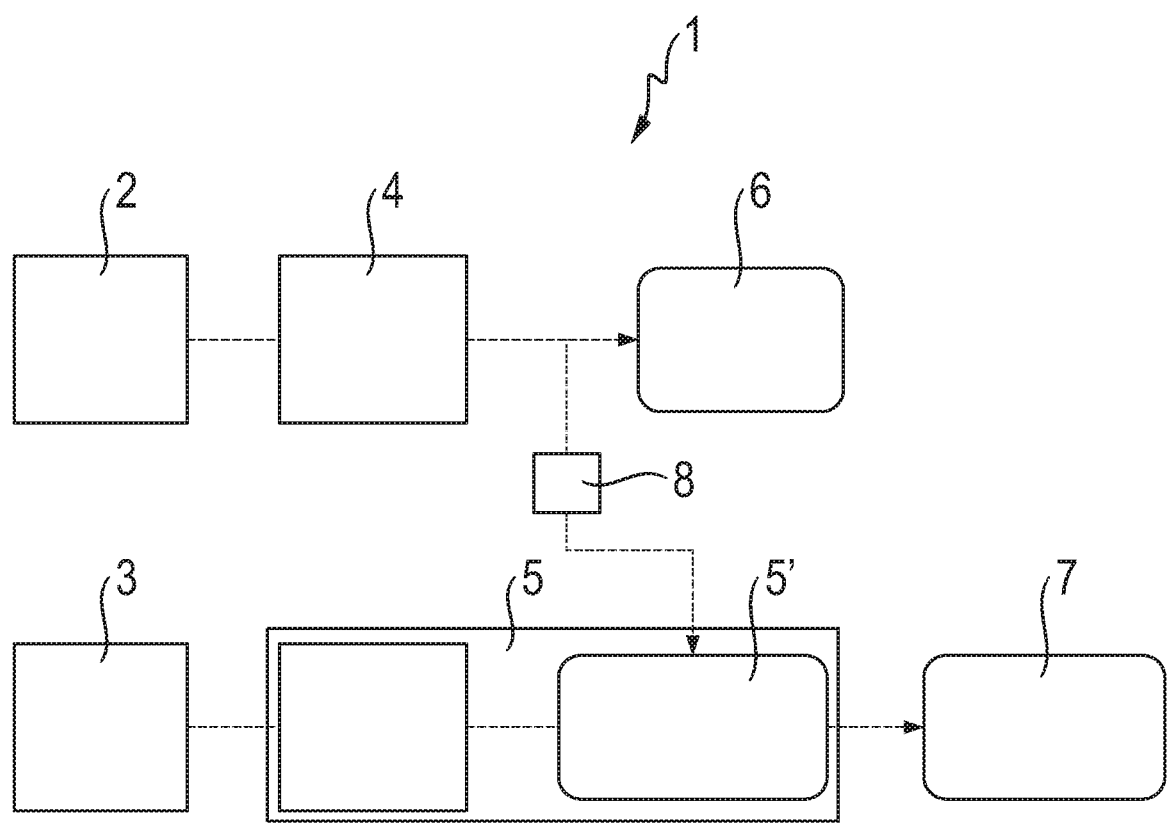
FIG. 1 shows, by way of example and schematically, a possible exemplary arrangement of a drive train according to the disclosure for a working machine.

Identical objects, functional units and comparable components are designated with the same reference numerals throughout the figures. These objects, functional units and comparable components are identical in form in terms of their technical features, unless explicitly or implicitly apparent otherwise from the description.

FIG. 1 shows, by way of example and schematically, a possible exemplary arrangement of a drive train 1 according to the disclosure for a working machine, not shown in FIG. 1. The drive train 1, shown by way of example, comprises a first electric motor 2 and a second electric motor 3 and also a first transmission arrangement 4 and a second transmission arrangement 5. The second transmission arrangement 5 is configured to be power-shiftable over a plurality of gear stages. The first electric motor 2 and the first transmission arrangement 4 are associated with a working drive 6 of the drive train 1, wherein the working drive 6 is in the form of, for example, a PTO (power take off) interface 6. The second electric motor 3 and the second transmission arrangement 5, on the other hand, are associated with a traction drive 7 of the drive train 1. Moreover, a drive connection can be established between the first electric motor 2 and the second transmission arrangement 5 via a first clutch 8, wherein the drive connection can be established according to the example specifically from the first electric motor 2 to an intermediate shaft 5' of the second transmission arrangement 5. The drive connection from the first electric motor 2 to the second transmission arrangement 5 advantageously allows the traction drive 7 to be driven by the first electric motor 2, which is actually associated with the working drive 6, during a shifting operation of the second transmission arrangement 5. The second electric motor 3 can thus be separated from the traction drive 7 in terms of drive and a speed synchronization in the sense of a speed reduction of the second electric motor 3 can be set or adjusted, without any loss of traction in the traction drive 7. Accordingly, when the method according to the disclosure is implemented, it is not necessary to achieve the speed synchronization by friction work, so that corresponding clutches of the second transmission arrangement 5 can be designed so as to be comparatively smaller and less expensive than is conventional in the prior art. The speed reduction of the second electric motor 3 that is necessary for the speed synchronization is instead accomplished according to the example by an energization of the second electric motor 3 in the opposite direction to the present direction of rotation.

Figure 2:
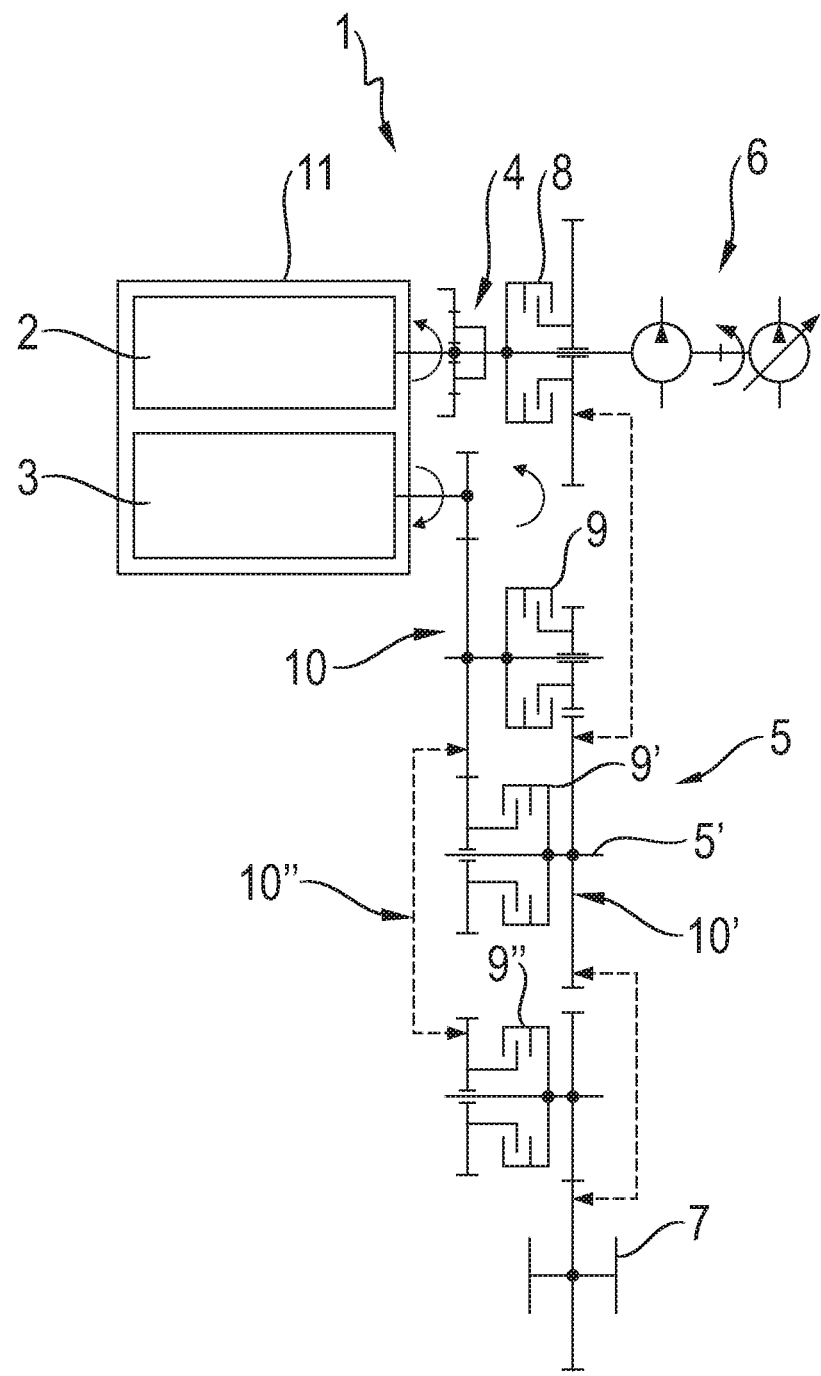
FIG. 2 shows, by way of example, a further possible exemplary arrangement of a drive train according to the disclosure for a working machine in the form of a wheel diagram.

FIG. 2 shows, by way of example, a further possible exemplary arrangement of a drive train 1 according to the disclosure for a working machine, not shown in FIG. 2, in the form of a wheel diagram. According to the example, the drive drain 1 of FIG. 2 comprises a first electric motor 2 and a second electric motor 3, which are arranged in a common housing 9. The drive train 1 of FIG. 2 further comprises a first transmission arrangement 4 and a second transmission arrangement 5, wherein the first electric motor 2 and the first transmission arrangement 4 are associated with a working drive 6 of the drive train 1. The second electric motor 3 and the second transmission arrangement 5, on the other hand, are associated with a traction drive 7 of the drive train 1. A drive connection can be established between the first electric motor 2 and the second transmission arrangement 5 via a first clutch 8, wherein the drive connection can be established according to the example from the first electric motor 2 to an intermediate shaft 5' of the second transmission arrangement 5. The first electric motor 2 can thus drive the traction drive 7 when the first clutch 8 is closed. The second transmission arrangement further comprises, according to the example, three second clutches 9, 9' and 9'', in order to provide three different spur gear stages 10, 10', 10'' three shiftable gear stages of the second transmission arrangement 5.

Figure 3:
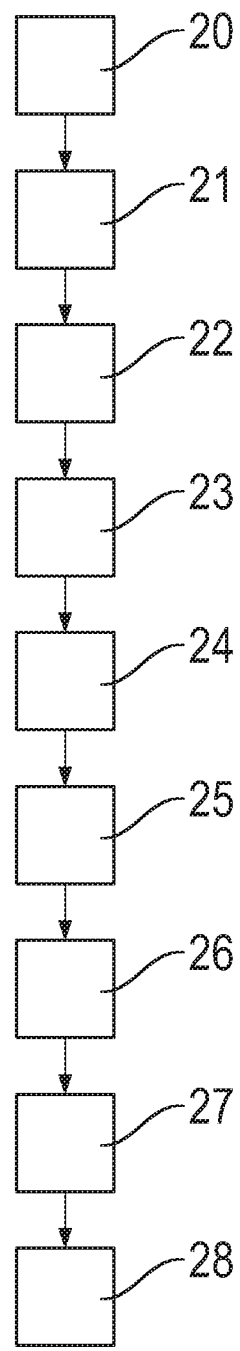
FIG. 3 shows, by way of example and schematically, a possible exemplary arrangement of a method according to the disclosure for operating a drive train for a working machine in the form of a flow diagram.

FIG. 3 shows, by way of example and schematically, a possible exemplary arrangement of a method according to the disclosure for operating a drive train 1 for a working machine in the form of a flow diagram. A first electric motor 2 of the drive train 1 drives a working drive 6 of the working machine via a first transmission arrangement 4, and a second electric motor 3 of the drive train 1 drives a traction drive 7 of the working machine via a second transmission arrangement 5. In method step 20, a shifting operation from a lower gear stage into a higher gear stage of the second transmission arrangement 5 is initiated by an operator of the working machine. The shifting operation is initiated by operation of a corresponding shifting element of the working machine, according to the example by a gear selector lever.

In method step 21, a control device checks whether the first electric motor 2, which is associated with the working drive 6 of the working machine 1, still has sufficient power reserves to assist with the shifting operation as well as driving the working machine 6. According to the example, this is the case, since the working drive 6 is at present not being driven.

In the following method step 22, therefore, a drive connection is established between the first electric motor 2 and the second transmission arrangement 5, which is accomplished by closing a first clutch 8.

In method step 23, the first clutch 8 is closed completely and both the first electric motor 2 and the second electric motor 3 transmit power to the traction drive 7, that is to say drive the traction drive 7.

In method step 24, the second electric motor 3 reduces the power it transmits to the traction drive 7, wherein at the same time the first electric motor 2 increases the power it transmits to the traction drive 7. The increase in the power transmitted by the first electric motor 2 corresponds exactly to the reduction in the power transmitted by the second electric motor 3, so that a power difference between a power requirement of the traction drive 7 and a power which can be provided by the second electric motor 3 during the shifting operation is bridged. In the following method step 25, the second electric motor 3 reduces the power it transmits to the traction drive 7 to zero, while the first electric motor 2 increases the power it transmits to the traction drive 7 further. The traction drive 7 is now driven solely by the first electric motor 2.

In step 26, a second clutch 9 of the second transmission arrangement 5 that is involved in the shifting operation opens, so that a drive connection of the second electric motor 2 to the traction drive 7 is interrupted. The second electric motor 3 then begins a speed synchronization in the form of a speed reduction. The speed reduction is carried out, according to the example, by transferring the second electric motor 3 into a generator mode with maximum current production. As soon as the necessary speed reduction is complete and speed synchronization has been achieved, the clutch 9' of the second transmission arrangement 5 that is likewise involved in the shifting operation closes. A drive connection between the second electric motor 3 and the traction drive 7 is thus established again.

In method step 27, the first electric motor 2 reduces the power it transmits to the traction drive 7, while the second electric motor 3 increases the power it transmits to the traction drive 7 by the same amount. The reduction in the power transmitted by the first electric motor 2 corresponds in this case exactly to the increase in the power transmitted by the second electric motor 3. The traction drive 7 thus receives a constant supply of power.

Finally, in method step 28, the first electric motor 2 no longer transmits any power to the traction drive 7. The traction drive 7 is again driven solely by the second electric motor 3. The first clutch 8 opens and thus interrupts the drive connection between the first electric motor 2 and the second transmission arrangement 5, or the traction drive 7. The shifting operation is thus complete. Since power has been transmitted from the first electric motor 2 or from the second electric motor 3 to the second transmission arrangement 5, or to the traction drive 7, during the entire shifting operation, the shifting operation was carried out under power. The drive train 1 is thus power-shiftable.

Figure 4:
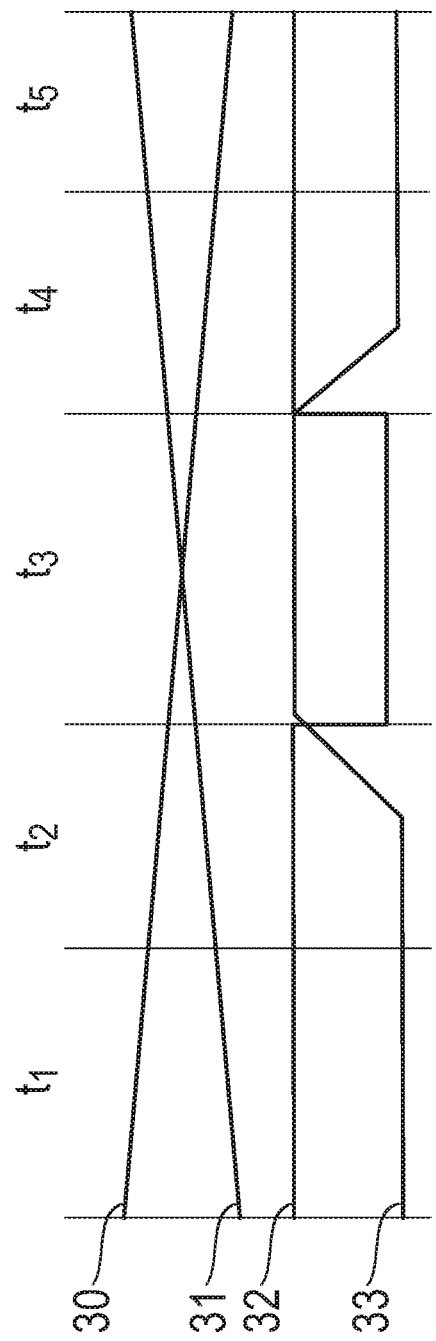
FIG. 4 shows, by way of example and schematically, a torque curve of the traction drive, a speed curve of the traction drive and also a power curve of the second electric motor and a power curve of the first electric motor during the shifting operation.

FIG. 4 shows, by way of example and schematically, a torque curve 30 of the traction drive 7, a speed curve 31 of the traction drive 7, and also a power curve 32 of the second electric motor 3 and a power curve 33 of the first electric motor 2 during the shifting operation. The shifting operation of the second transmission arrangement 5 from a lower gear stage into a higher gear stage begins at time $t_1$. At time $t_1$, the traction drive 7 is driven solely by the second electric motor 3 via a second clutch 9. The first clutch 8 for establishing a drive connection between the first electric motor 2 and the second transmission arrangement 5 is open. The torque at the traction drive 7 falls, at the same time the speed increases.

At time $t_2$, the first clutch 8 is closed. At the same time, the first electric motor 2 begins to transmit power to the traction drive 7. As soon as the first electric motor 2 is transmitting sufficient power to the traction drive 7, the second electric motor 3 is switched into generator mode in order to affect a speed reduction. The torque at the traction drive 7 falls further and the speed at the traction drive 7 increases further. At time $t_3$, the second clutch 9' is closed, while the first clutch 8 likewise remains closed. The closing of the second clutch 9' represents the change of the gear stage of the second transmission arrangement 5. Also at time $t_3$, the torque at the traction drive 7 falls further and the speed at the traction drive 7 increases further.

At time $t_4$, the second electric motor 3 begins to transmit power to the second transmission arrangement 5 and thus to the traction drive 7 again. At the same time, the first electric motor 2 reduces the power it transmits to the second transmission arrangement 5 and thus to the traction drive 7. The first clutch 8 and the second clutch 9' are both closed. The torque at the traction drive 7 falls further and the speed at the traction drive 7 increases further. At time $t_5$, the first clutch 8 is opened and thus the drive connection between the first electric motor 2 and the second transmission arrangement 5, or the traction drive 7, is interrupted. The second clutch 9' remains closed. The traction drive 7 is thus again driven wholly by the second electric motor 3, and for this reason the second electric motor 3 increases its power again. The power of the first electric motor 2 is reduced again. The torque at the traction drive 7 again falls further and the speed at the traction drive 7 again increases further. The shifting operation is thus complete.

The invention claimed is:

1. A method for operating a drive train for a working machine, comprising providing a first electric motor, wherein the first electric motor drives a working drive of the working machine via a first transmission arrangement, providing a second electric motor, wherein the second electric motor drives a traction drive of the working machine via a second transmission arrangement, and carrying out a speed reduction of the second electric motor during a shifting operation of the second transmission arrangement from a lower gear stage into a higher gear stage, establishing a drive connection between the first electric motor and the second transmission arrangement via a first clutch during the shifting operation, so that the first electric motor drives the traction drive during the shifting operation; wherein the first electric motor drives the traction drive only inasmuch as a power difference between a power requirement of the traction drive and a power which can be provided by the second electric motor during the shifting operation is bridged.

2. The method as claimed in claim 1, wherein the shifting operation is carried out under power.

3. The method as claimed in claim 1 wherein the first electric motor drives the traction drive and the working drive simultaneously during the shifting operation.

4. The method as claimed in claim 1, wherein the first electric motor drives the traction drive only inasmuch as a power requirement of the working drive can be met fully during the shifting operation.

5. The method of claim 1, wherein the shifting operation is carried out under power and wherein the first electric motor drives the traction device and the working drive simultaneously during the shifting operation.

6. The method of claim 1, wherein the speed reduction of the second electric motor for speed synchronization is accomplished by transferring the electric motor into a generator mode, so that speed reduction results, without energization, solely from an electromagnetic braking force which the rotor of the second electric motor experiences due to the generator mode.

7. A drive train for a working machine, comprising: a first electric motor and a second electric motor and also a first transmission arrangement and a second transmission arrangement, wherein the first electric motor and the first transmission arrangement are associated with a working drive of the working machine and wherein the second electric motor and the second transmission arrangement are associated with a traction drive of the working machine, and wherein a drive connection can be established between the first electric motor and the second transmission arrangement via a first clutch; wherein the second transmission arrangement is power-shiftable over a plurality of gear stages; wherein the gear stages are in the form of forward gears and at least one reverse gear.

8. The drive train as claimed in claim 7, wherein the first electric motor and the second electric motor are arranged in a common housing.

9. The drive train as claimed in claim 7 wherein the drive train is configured to implement a method as claimed in claim 1.

10. A working machine comprising a drive train as claimed in claim 7.

11. The working machine as claimed in claim 10, wherein the working machine is in the form of a wheel loader.

12. The drive train of claim 7, wherein the first electric motor and the second electric motor are arranged in a common housing and wherein the second transmission arrangement is power-shiftable over a plurality of gear stages.

13. The drive train of claim 7, wherein a plurality of first electric motors are provided and a plurality of second electric motors are provided, wherein the plurality of first and second electric motors can be coupled with one another via a summation gear.

14. The drive train of claim 7, wherein a plurality of first electric motors are provided and a plurality of second electric motors are provided, wherein the plurality of first and second electric motors are separably connected in terms of drive to the first and second transmission arrangements.

15. The drive train of claim 7, wherein a number of forward gears corresponds to a number of reverse gears.

16. A method for operating a drive train for a working machine, comprising providing a first electric motor, wherein the first electric motor drives a working drive of the working machine via a first transmission arrangement, providing a second electric motor, wherein the second electric motor drives a traction drive of the working machine via a second transmission arrangement, and carrying out a speed reduction of the second electric motor during a shifting operation of the second transmission arrangement from a lower gear stage into a higher gear stage, establishing a drive connection between the first electric motor and the second transmission arrangement via a first clutch during the shifting operation, so that the first electric motor drives the traction drive during the shifting operation wherein the speed reduction of the second electric motor for speed synchronization is accomplished by energization of the second electric motor in an opposite direction of a current direction of rotation.

* * * * *